United States Patent [19]

Burns et al.

[11] Patent Number: 6,051,672
[45] Date of Patent: Apr. 18, 2000

[54] METHOD FOR MAKING HYDROPHOBIC NON-AGGREGATED COLLOIDAL SILICA

[75] Inventors: Gary Thomas Burns, Ohain, Belgium; Jon Vierling DeGroot, Jr., Midland, Mich.; James Richard Hahn, Midland, Mich.; Daniel Anton Harrington, Midland, Mich.; Patricia Ann Moore, Midland, Mich.

[73] Assignee: Dow Corning Corporation, Midland, Mich.

[21] Appl. No.: 09/138,906

[22] Filed: Aug. 24, 1998

[51] Int. Cl.⁷ ..................................................... C08G 77/00
[52] U.S. Cl. .................................. 528/10; 528/31; 106/490
[58] Field of Search ......................... 528/31, 10; 106/490

[56] References Cited

U.S. PATENT DOCUMENTS

| | | | |
|---|---|---|---|
| 3,015,645 | 1/1962 | Tyler | 260/46.5 |
| 3,122,520 | 2/1964 | Lentz | 106/490 |
| 4,208,316 | 6/1980 | Nauroth et al. | 260/37 SB |
| 4,881,975 | 11/1989 | Collier et al. | 106/14.05 |
| 5,009,874 | 4/1991 | Parmentier et al. | 423/335 |
| 5,708,069 | 1/1998 | Burns et al. | 524/403 |
| 5,942,590 | 8/1999 | Burns et al. | 528/10 |

FOREIGN PATENT DOCUMENTS

| | | | |
|---|---|---|---|
| 1110331 | 5/1965 | United Kingdom | C01B 33/18 |

*Primary Examiner*—Robert Dawson
*Assistant Examiner*—Jeffrey B. Robertson
*Attorney, Agent, or Firm*—William F. Boley

[57] ABSTRACT

A method for making hydrophobic non-aggregated colloidal silica comprising reacting an aqueous suspension of a hydrophilic non-aggregated colloidal silica having an average particle diameter greater than about 4 nm with a silicon compound at a pH less than about pH 4 in the presence of a sufficient quantity of a water-miscible organic solvent to facilitate contact of the hydrophilic non-aggregated colloidal silica with the silicon compound. The method is conducted at a temperature within a range of about 20° C. to 250° C. for a period of time sufficient to form a hydrophobic non-aggregated colloidal silica. The hydrophobic non-aggregated colloidal silicas prepared by the present method are particularly useful as fillers in silicone compositions such as adhesives, rubbers, and sealants.

26 Claims, No Drawings

METHOD FOR MAKING HYDROPHOBIC NON-AGGREGATED COLLOIDAL SILICA

BACKGROUND OF INVENTION

The present invention is a method for making hydrophobic non-aggregated colloidal silicas useful, for example, as fillers in silicone compositions. The method comprises reacting an aqueous suspension of a hydrophilic non-aggregated colloidal silica having an average particle diameter greater than about 4 nm with a silicon compound at a pH less than about pH 4 in the presence of a sufficient quantity of a water-miscible organic solvent to facilitate contact of the hydrophilic non-aggregated colloidal silica with the silicon compound. The method is conducted at a temperature within a range of about 20° C. to 250° C. for a period of time sufficient to form a hydrophobic non-aggregated colloidal silica.

The hydrophobic non-aggregated colloidal silicas prepared by the present method are useful in many applications where fumed silicas, precipitated silicas, and silica gels are useful. However, the hydrophobic non-aggregated colloidal silicas prepared by the present method are particularly useful as reinforcing and extending fillers in organic rubbers and silicone rubber compositions including silicone adhesives, rubbers, and sealants. It is well known that cured silicone compositions, such as silicone rubbers, formed from the curing of polydiorganosiloxane fluids and gums alone generally have low elongation and tensile strength properties. One means for improving the physical properties of such silicone compositions involves the incorporation of an aggregated reinforcing silica filler, such as fumed silica, precipitated silica, or silica gel into the fluid or gum prior to curing. However, such aggregated silicas typically contain hydroxyl functionalities which cause the silicas to be hydrophilic. Such hydrophilic silicas are difficult to incorporate into silicone compositions comprising hydrophobic polydiorganosiloxane polymers and further cause the silica to react with the polymers causing a phenomenon typically referred to as "crepe hardening". A great deal of effort has been made in the past to treat the surface of aggregated reinforcing silica fillers with organosilanes or organosiloxanes to make the surface of the silica hydrophobic. This surface treatment reduces or diminishes the tendency of the silicone compositions to crepe harden and improves the physical properties of the cured silicone compositions. The present method provides a process for hydrophobing non-aggregated colloidal silica without causing aggregation of the colloidal silica.

The hydrophobic non-aggregated colloidal silicas produced by the present method are spherical in shape and can have a smaller particle size than that of aggregate silicas while providing comparable reinforcement. Therefore, the use of the hydrophobic non-aggregated colloidal silica produced by the present method can result in compositions with reduced viscosity, such as liquid silicone rubber compositions, and compositions having better clarity.

Processes for hydrophobing fumed silica by the use of, for example, organochlorosilanes, siloxanes, and disilazanes are well known in the art. For example, British Patent Specification No. 1,110,331 describes the hydrophobing of an aqueous suspension of fumed silica with an alkylhalosilane and the subsequent flocculation in a water-immiscible organic liquid.

Processes for making hydrophobic silica gels are also described in the art. Lentz, U.S. Pat. No. 3,015,645 teaches the making of hydrophobic silica powders by reacting an organosilicon compound such as dimethyldichlorosilane or trimethylmethoxysilane with a silica organogel in the presence of an acidic catalyst to form a hydrophobic silica hydrogel. The hydrophobic silica hydrogel in the aqueous phase is contacted with a water-immiscible organic solvent to convert the hydrophobic silica hydrogel to a hydrophobic silica organogel which segregates into the organic phase. More recently, Burns et al., U.S. Pat. No. 5,708,069 have described a process for making hydrophobic silica gels under neutral conditions. The method comprises two steps, where in the first step the pH of a silica hydrosol is adjusted with a base to within a range of about pH 3 to pH 7 to facilitate formation of a silica hydrogel. In the second step the silica hydrogel is contacted with an organosilicon compound in the presence of a catalytic amount of an acid to effect hydrophobing of the silica hydrogel. In a preferred method, in a third step the hydrophobic silica hydrogel is contacted with a water-immiscible organic solvent to convert the hydrophobic silica hydrogel into an organogel which separates from the aqueous phase.

Parmentier et al., U.S. Pat. No. 5,009,874 describe a method for making a hydrophobic precipitated silica useful as a reinforcing filler in silicone elastomers. In a first step the precipitated silica in aqueous suspension is hydrophobed with an organosilicon compound. In a second step a water-immiscible organic solvent is added to effect separation of the hydrophobic precipitated silica from the aqueous phase.

Castaing et al., Europhysics Letters 36(2) 153–8, 1996, describe the formation of a silicone elastomer, having good physical properties, incorporating a colloidal silica having adsorbed polydimethylsiloxane on the surface.

SUMMARY OF INVENTION

The present invention is a method for making hydrophobic non-aggregated colloidal silica. The method comprises reacting an aqueous suspension of a hydrophilic non-aggregated colloidal silica having an average particle diameter greater than about 4 nm with a silicon compound at a pH less than about pH 4 in the presence of a sufficient quantity of a water-miscible organic solvent to facilitate contact of the hydrophilic non-aggregated colloidal silica with the silicon compound. The method is conducted at a temperature within a range of about 20° C. to 250° C. for a period of time sufficient to form a hydrophobic non-aggregated colloidal silica. The hydrophobic non-aggregated colloidal silicas prepared by the present method are particularly useful as fillers in silicone compositions such as adhesives, rubbers, and sealants.

DESCRIPTION OF INVENTION

The present invention is a method for making a hydrophobic non-aggregated colloidal silica. The method comprises reacting an aqueous suspension of a hydrophilic non-aggregated colloidal silica having an average particle diameter greater than about 4 nm with a silicon compound selected from the group consisting of organosilanes described by formula

$$R^1{}_aH_bSiX_{4-a-b} \tag{1}$$

and organosiloxanes described by formula

$$R^1{}_nSiO_{(4-n)/2}, \tag{2}$$

where each $R^1$ is independently selected from the group consisting of hydrocarbon radicals comprising 1 to about 12 carbon atoms and organofunctional hydrocarbon radicals comprising 1 to about 12 carbon atoms, each X is independently selected from the group consisting of halogen and alkoxy radicals comprising 1 to about 12 carbon atoms, a=0, 1, 2, or 3, b=0 or 1, a+b=1, 2, or 3 with the proviso that when b=1 then a+b=2 or 3, and n is an integer of from 2 to 3 inclusive at a pH less than about pH 4 in the presence of a sufficient quantity of a water-miscible organic solvent to facilitate contact of the hydrophilic non-aggregated colloidal silica with the silicon compound at a temperature within a range of about 20° C. to 250° C. and for a time period sufficient to form a hydrophobic non-aggregated colloidal silica.

The hydrophilic colloidal silicas useful in the present invention are non-aggregated, essentially spherical-shaped particles having an average particle diameter greater than about 4 nm (nanometer). By "non-aggregated", it is meant that the colloidal silica exists in aqueous suspension in large part as discrete spherical particles. Preferred is when the colloidal silica has an average particle diameter within a range of greater than about 4 nm to about 150 nm. Even more preferred is when the colloidal silica has an average particle diameter within a range of about 5 nm to 100 nm.

The hydrophilic non-aggregated colloidal silica is added to the present method as an aqueous suspension. The concentration of colloidal silica in aqueous suspension is not critical and can be varied within wide limits. To facilitate mixing and dispersion of the silicon compound in the method it is generally preferred that the colloidal silica comprise about 1 weight percent to 50 weight percent of the aqueous suspension. More preferred is when the colloidal silica comprises about 5 weight percent to 20 weight percent of the aqueous suspension.

In a preferred process the hydrophilic non-aggregated colloidal silicas useful in the present method are stabilized against aggregation to form gels by a method such as alkalization of an aqueous suspension of the colloidal silica by addition of compounds such as sodium hydroxide, potassium hydroxide, or ammonia. The colloidal silica may be stabilized against aggregation by the addition of a short chain amine such as formamide, ethylamine, morpholine, or ethanolamine.

The non-aggregated hydrophilic colloidal silicas which are reacted in the present method are "hydrophilic" as a result of hydroxyl groups on the surface of the silica particles and are therefore generally incompatible with hydrophobic substances such as non-polar organic solvents and polydiorganosiloxanes.

The method of making the hydrophilic non-aggregated colloidal silica is not critical and can generally be any of those known in the art. For example, a silica hydrosol may be prepared by acidifying a sodium silicate mixture with subsequent stabilization of the silica particles by a method such as described above to provide an essentially spherical shaped, hydrophilic non-aggregated colloidal silica in an aqueous suspension.

In the present method an aqueous suspension of the hydrophilic non-aggregated colloidal silica is reacted with one or more of the organosilicon compounds described by formulas (1) and (2), above, to effect hydrophobing of the colloidal silica. In formulas (1) and (2), each $R^1$ can be independently selected from the group consisting of hydrocarbon radicals comprising 1 to about 12 carbon atoms and organofuctional hydrocarbons radicals comprising 1 to about 12 carbon atoms. $R^1$ can be a saturated or unsaturated hydrocarbon radical. $R^1$ can be a substituted or non-substituted hydrocarbon radical. $R^1$ can be, for example, alkyl radicals such as methyl, ethyl, t-butyl, hexyl, heptyl, octyl, decyl, and dodecyl; alkenyl radicals such as vinyl, allyl, and hexenyl; substituted alkyl radicals such as chloromethyl, 3,3,3-trifluoropropyl, and 6-chlorohexyl; and aryl radicals such as phenyl, naphthyl, and tolyl. $R^1$ can be an organofunctional hydrocarbon radical comprising 1 to about 12 carbon atoms where, for example, the functionality is mercapto, disulfide, polysulfide, amino, carboxylic acid, carbinol, ester, or amido. A preferred organofunctional hydrocarbon radical is one having disulfide or polysulfide functionality.

In formula (1) each X is independently selected from the group consisting of halogen and alkoxy radicals comprising 1 to about 12 carbon atoms. When X is a halogen, it is preferred that the halogen be chlorine. When X is an alkoxy radical, X may be, for example, methoxy, ethoxy, and propoxy. Preferred is where each X is selected from the group consisting of chlorine atoms and methoxy.

The viscosity of the organosiloxanes described by formula (2) is not limiting and can range from that of a fluid to a gum. Generally, higher molecular weight organosiloxanes will be cleaved by the acidic conditions of the present method allowing them to react with the hydrophilic non-aggregated colloidal silica.

The organosilicon compound may be provided to the present method as a single compound as described by formula (1) or (2) or as a mixture of two or more organosilicon compounds described by formulas (1) and (2).

Examples of useful organosilicon compounds include diethyldichlorosilane, allylmethyldichlorosilane, methylphenyldichlorosilane, ethylphenyldiethoxysilane, 3,3,3-trifluoropropylmethyldichlorosilane, trivinyltrimethylcyclotrisiloxane, hexaethyldisiloxane, pentylmethyldichlorosilane, divinyldipropoxysilane, vinyldimethylchlorosilane, vinylmethyldichlorosilane, vinyldimethylmethoxysilane, trimethylchlorosilane, hexamethyldisiloxane, hexenylmethyldichlorosilane, hexenyldimethylchlorosilane, dimethylchlorosilane, dimethyldichlorosilane, mercaptopropylmethyldimethoxysilane, and bis{3-(triethoxysilyl)propyl}tetrasulfide. When the hydrophobic non-aggregated colloidal silica is to be used as a filler in silicone rubber, it is preferred that the organosilicon compound be selected from the group consisting of hexamethyldisiloxane, 1,3-di-vinyl-1,1,3,3-tetramethyldisiloxane, vinylmethyldichlorosilane, and vinyldimethylchlorosilane.

The amount of organosilicon compound added to the present method is that sufficient to adequately hydrophobe the hydrophilic non-aggregated colloidal silica suitable for its intended use. Generally the organosilicon compound should be added to the method in an amount such that there is at least about 0.1 organosilyl unit per square nanometer of surface of the hydrophilic non-aggregated colloidal silica. It is preferred that the organosilicon compound be added in an amount providing excess organosilyl units in relation to the hydroxyl groups available on the hydrophilic non-aggregated colloidal silica for reaction. The upper limit of the amount of organosilicon compound added to the method is not critical, since any amount in excess of the amount required to react with the silicon bonded hydroxyl groups will act as a solvent in the method.

The present method requires the presence of a sufficient quantity of a water-miscible organic solvent to facilitate contact of the hydrophilic non-aggregated colloidal silica with the silicon compound. Generally, the water-miscible organic solvent can comprise about 10 to 50 volume percent of the total volume of the components present in the mixture.

It is preferred that the water miscible organic solvent comprise at least 20 volume percent of the total volume of the components present in the mixture. Even more preferred is when the water-miscible organic solvent comprises about 25 to 35 volume percent of the total volume of the components present in the mixture. Suitable water-miscible organic solvents include, for example, alcohols such as ethanol, propanol, isopropanol, and tetrahydrofuran. A preferred water-miscible organic solvent is isopropanol.

If desired, a surfactant may be added to the present method to further facilitate contact of the organosilicon compound with the non-aggregated hydrophilic colloidal silica. Any anionic or nonionic surfactant may be added to the aqueous suspension that does not cause aggregation or gelation of the non-aggregated colloidal silica. The surfactant may be either anionic surfactants such as deodecylbenzene sulfonic acid, or nonionic surfactants such as polyoxyethylene(23) lauryl ether and $(Me_3SiO)_2MeSi(CH_2)_3(OCH_2CH_2)_7OMe$ where Me is methyl.

The reaction of the present method is conducted at a pH less than about pH 4, and preferably at a pH within a range of about pH 0 to pH 3.5. Aqueous suspensions of hydrophilic non-aggregated colloidal silicas useful in the present method are typically most stable against aggregation at a pH within a range of about pH 9 to pH 11 and are therefore typically maintained within this pH range until use. Therefore, in the present method it is typically necessary to adjust the pH of the aqueous suspension of hydrophilic non-aggregated colloidal silica with an acid to the desired pH. The acid acts as a catalyst in the method, facilitating the reaction of the organosilicon compound with the non-aggregated hydrophilic colloidal silica. The acid can be, for example, a mineral acid such as hydrochloric, hydroiodic, sulfuric, nitric, benzene sulfonic, and phosphoric acid. When the organosilicon compound is, for example, a chlorosilane, a portion or all of the required acid may be generated in situ by hydrolysis of the chlorosilane or the reaction of the chlorosilane directly with hydroxyls of the hydrophilic non-aggregated colloidal silica.

The temperature at which the reaction of the present method is conducted is not critical and can be within a range of about 20° C. to 250° C. Generally, it is preferred that the reaction be conducted at a temperature within a range of about 30° C. to 1 50° C.

In the present method, the pH at which the reaction is conducted is one in which the stability of the non-aggregated colloidal silica against aggregation is reduced. Therefore, the length of time for which the non-aggregated colloidal silica can be maintained under the reaction conditions without significant aggregation occurring will depend on such factors as the size and stabilization method of the colloidal silica, silicon compound, and the pH and temperature at which the reaction is conducted. The length of this contact period is not limiting on the present method as long as adequate hydrophobing of the hydrophilic non-aggregated colloidal silica is achieved for its intended purpose without significant aggregation of the colloidal silica. Generally a contact time within a range of about 0.25 hour to 4 hours may be acceptable, with a contact time of about 0.5 hour to 2 hours being preferred.

At the end of the contact period the reaction may be terminated by adding a base to elevate the pH of the mixture to a pH where the resulting hydrophobic non-aggregated colloidal silica is stable in suspension or by effecting precipitation of the hydrophobic non-aggregated colloidal silica from the aqueous phase. Depending upon the size of the hydrophobic non-aggregated colloidal silica added to the present method and the conditions under which the reaction is conducted, the hydrophobic non-aggregated colloidal silica product may spontaneously separate from the aqueous phase. However, typically it is desirable to add a water-immiscible organic solvent in an amount sufficient to effect separation of the hydrophobic non-aggregated colloidal silica from the aqueous phase. Any organic solvent immiscible with water can be used to effect separation of the hydrophobic non-aggregated colloidal silica from the aqueous phase. Suitable water-immiscible organic solvents include low molecular weight siloxanes such as hexamethyldisiloxane, octamethylcyclotetrasiloxane, diphenyltetrrmethyldisiloxane and trimethylsiloxy endblocked polydimethylsiloxane fluids. Other useful water-immiscible organic solvents include aromatic hydrocarbons such as toluene and xylene; heptane, hexane, and other aliphatic hydrocarbon solvents; cycloalkanes such as cyclohexane; ethers such as diethylether and dibutylether; halohydrocarbons solvents such as methylene chloride, chloroform, ethylene chloride, and chlorobenzene; and ketones such as methylisobutylketone.

The amount of water-immiscible organic solvent which may be added to the present method can be any amount sufficient to effect separation of the hydrophobic non-aggregated colloidal silica from the aqueous phase. Generally a solvent to silica weight ratio within a range of about 0.1:1 to 10:1 is preferred. More preferred is a solvent to silica weight ratio within a range of about 1:1 to 5:1. The upper limit for the amount of water-immiscible organic solvent which may be added to the present method is limited only by economic considerations such as solvent cost, solvent recovery or disposal, and equipment capacity.

It is preferred that the water-immiscible organic solvent have a boiling point below about 250° C. to facilitate removal from the hydrophobic non-aggregated colloidal silica, if desired. However, the boiling point of the water-immiscible organic solvent is not critical since the solvent may be removed from the hydrophobic non-aggregated colloidal silica by such methods as filtration, centrifugation, or spray drying.

The hydrophobic non-aggregated colloidal silicas prepared by the present method are especially useful as reinforcing and extending fillers in silicone compositions such as silicone adhesives, silicone elastomers, and silicone sealants. The hydrophobic non-aggregated colloidal silicas maybe be used in any such silicone compositions where silica fillers such as fumed silicas and precipitated silicas are used. When the hydrophobic non-aggregated colloidal silicas are used as reinforcing fillers in silicone compositions it may be desirable that one or more silicon compounds reacted with the silica contain one or more unsaturated aliphatic substituents thereby imparting functionality to the hydrophobic non-aggregated colloidal silica which may be reacted with other components of the silicone composition to improve reinforcement. Such unsaturated aliphatic substituents can include alkenyl groups such as vinyl, allyl, and hexenyl.

The following examples are provided to illustrate the present invention and are not intended to limit the scope of the claims herein.

EXAMPLE 1

Approximately 775 ml of concentrated HCl, 225 ml of deionized water, 1 L of isopropanol, and 178 ml of hexamethyldisiloxane were added to a 5 L flask. Approximately 1.2 L of a 15 weight percent solids aqueous suspension of hydrophilic non-aggregated colloidal silica (Nalcol® 1115, average particle diameter of 4 nm, Nalco Chemical Company, Chicago, Ill.) was diluted with distilled water to 2 L volume and slowly added to the 5 L flask over a period of about 45 to 60 minutes. The resulting mixture was stirred an additional 15 to 30 minutes. Then, 300 ml of toluene were added to the flask to effect separation of the resulting hydrophobic colloidal silica from the aqueous phase into the toluene phase. The aqueous phase was removed from the flask, an additional 1.5 L of toluene added, and the toluene phase was heated to reflux for 2 to 3 hours and residual water removed. Then 1.6 ml of vinyldimethylchlorosilane were added to the toluene phase and the resulting mixture heated to reflux for 15 minutes. The mixture was cooled and washed with deionized water and again heated to reflux for 2 to 3 hours to remove residual water.

The resulting hydrophobic colloidal silica was viewed by transmission electron microscopy (TEM) for particle size and aggregation. The amount of surface treatment of the hydrophobic colloidal silica was analyzed by digesting a sample of the silica to remove the surface treatment and the digest analyzed by gas chromatography using a flame ionization detector (GC-FID). The results of the GC-FID analysis is reported in Table 1. The TEM observation of the hydrophobic colloidal silica showed a primary particle size between 4–5 nm and the particles appeared to be moderately clumped.

TABLE 1

GC-FID Analysis Results

|  | Wt. Percent |
|---|---|
| $Me_3SiO_{1/2}$ | 16.55 |
| $Me_2ViSiO_{1/2}$ | 0.07 |
| $Me_2SiO$ | 0.07 |
| $MeSiO_{3/2}$ | 0.00 |
| $SiO_2$ | 83.31 |

EXAMPLE 2

The treatment method of Example 1 was repeated using a hydrophilic non-aggregated colloidal silica having an average particle diameter of 20 nm (Nalco® 1050, Nalco Chemical Company) and a hydrophilic non-aggregated colloidal silica having an average particle size diameter of 35 nm (Nalco® TX9468, Nalco Chemical Company). The amount of vinyldimethylchlorosilane added to the treatment method was varied and is reported in Table 2 along with the results of the GC-FID analysis of the treated colloidal silicas. TEM analysis of the resulting hydrophobic colloidal silicas showed discrete, non-aggregated particles. Representative TEM photographs where scanned using image analysis software to obtain a comparison of particle size between the hydrophilic non-aggregated colloidal silica added to the method and the resulting hydrophobic non-aggregated colloidal silica. The results of this analysis are reported in Table 3.

TABLE 2

GC-FID Analysis Results

| $ViMe_2SiCl$ (ml) | 0 | 2.8 | 5.6 | 0 | 1.7 | 3.3 |
|---|---|---|---|---|---|---|
| Particle Size (nm) | 20 | 20 | 20 | 35 | 35 | 35 |
| | Weight Percent of Treated Colloidal Silica Particles | | | | | |
| $Me_3SiO_{1/2}$ | 3.23 | 3.21 | 3.15 | 2.77 | 2.60 | 2.66 |
| $Me_2ViSiO_{1/2}$ | 0.00 | 0.00 | 0.05 | 0.00 | 0.02 | 0.03 |
| $Me_2SiO$ | 0.06 | 0.02 | 0.09 | 0.05 | 0.06 | 0.06 |
| $MeSiO_{3/2}$ | 0.00 | 0.00 | 0.00 | 0.00 | 0.00 | 0.00 |
| $SiO_2$ | 96.71 | 96.7 | 96.71 | 91.17 | 97.31 | 97.24 |

TABLE 3

Comparison of Treated and Untreated Colloidal Silica Particle Size

| Sample | Treatment | Mean (nm) | Mode (nm) | Std. Dev. |
|---|---|---|---|---|
| Nalco 1050 | untreated | 25 | 24 | ±5 |
| Nalco 1050 | treated | 28 | 25 | ±8 |
| Nalco TX9468 | untreated | 31 | 32 | ±5 |
| Nalco TX9468 | treated | 31 | 29 | ±7 |

EXAMPLE 3

Approximately 200 ml of concentrated HCl, 57 ml of deionized water and 250 ml of isopropanol were added to a 5 L flask. In a separate flask, 90 g of a hydrophilic non-aggregated colloidal silica in aqueous suspension having an average particle diameter of 20 nm (Nalco 1050) was diluted with distilled water to 800 ml total volume. The dilute colloidal silica suspension was added to the 5 L flask with stirring. Then, approximately 90 ml of a chlorosilane mixture consisting of trimethylchlorosilane and vinyldimethylchlorosilane at various volume ratios were slowly added to the flask. The volume ratio of the two chlorosilanes used in each run is reported in Table 4. The resulting mixture was heated to 70° C. while being stirred vigorously. After the temperature of the mixture reached 70° C., the heat was turned off and the mixture continued to be stirred until it reached room temperature. At this point the hydrophobic non-aggregated colloidal silica had precipitated from the aqueous phase. The aqueous phase was decanted and the precipitated silica washed with 250 ml of deionized water to remove residual HCl. The precipitated silica was suspended in 375 ml of toluene and the resulting suspension heated to remove residual water. Samples of the hydrophobic colloidal silica were analyzed by GC-FID as described in Example 1 and the results of this analysis are reported in Table 4. TEM observation of the hydrophobic colloidal silica showed it to be spherical, discrete particles, and non-aggregated.

TABLE 4

GC-FID Analysis Results

| | *Vol. Ratio | | | | | | |
|---|---|---|---|---|---|---|---|
| | 99 | 39 | 19 | 9 | 5.7 | 3 | 1 | 0.33 |
| | Weight percent of Colloidal Silica Particles | | | | | | | |
| $Me_3SiO_{1/2}$ | 3.16 | 3.09 | 2.98 | 2.92 | 2.83 | 2.64 | 1.91 | 1.05 |
| $Me_2ViSiO_{1/2}$ | 0.02 | 0.05 | 0.12 | 0.23 | 0.40 | 0.67 | 1.51 | 2.50 |
| $Me_2SiO$ | 0.01 | 0.01 | 0.02 | 0.03 | 0.03 | 0.04 | 0.07 | 0.08 |

TABLE 4-continued

GC-FID Analysis Results

*Vol. Ratio

| | 99 | 39 | 19 | 9 | 5.7 | 3 | 1 | 0.33 |
|---|---|---|---|---|---|---|---|---|
| | Weight percent of Colloidal Silica Particles | | | | | | | |
| MeSiO$_{3/2}$ | 0.02 | 0.03 | 0.03 | 0.02 | 0.02 | 0.03 | 0.02 | 0.02 |
| SiO$_2$ | 96.68 | 96.83 | 96.86 | 96.80 | 96.72 | 96.62 | 96.49 | 96.35 |

*Volume ratio of trimethylchorosilane to vinyldimethylchorosilane

EXAMPLE 4

A hydrophobic non-aggregated colloidal silica having an average particle diameter of 20 nm was prepared by the method described in Example 3. As in Example 3, the weight ratio of trimethylchlorosilane to vinyldimethylchlorosilane was varied. The weight percent vinyl present on the hydrophobic colloidal silica, as determined by GC-FID, is reported in Table 5. The ability of the non-aggregated colloidal silica to provide reinforcement to a platinum curing silicone rubber composition was tested by adding 60 weight percent of the colloidal silica to the silicone rubber composition. Cured samples of the platinum cured silicone rubber composition containing the hydrophobic non-aggregated colloidal silica where prepared by curing in a mold for 20 minutes at 150° C. and post curing for 1 hour at 177° C. and physical properties determined by the following test methods: Shore A durometer (Duro.) ASTM 2240, tear (die B) ASTM 625, and tensile, elongation and modulus by ASTM 412. The results of the physical properties testing are provided in Table 5.

TABLE 5

Physical Properties of Cured Silicone Elastomer Reinforced With Non-Aggregated Hydrophobic Colloidal Silica

| Wt. % Vinyl | 0.11 | 0.23 | 0.40 | 0.67 | 1.50 | 2.50 |
|---|---|---|---|---|---|---|
| Phys. Prop. | | | | | | |
| Duro. (Shore A) | 49 | 58 | 60 | 70 | 76 | 84 |
| Tensile, mPa | 7.78 | 7.91 | 7.89 | 5.37 | 6.10 | 3.63 |
| Tear (Die B), kN/m | 32.03 | 36.05 | 35.18 | 29.58 | 23.98 | 19.60 |
| Modulus (100%), MPa | 1.80 | 2.45 | 2.85 | 3.34 | 4.03 | — |
| Elongation, (%) | 452 | 376 | 314 | 198 | 186 | 73 |

We claim:

1. A method for making a hydrophobic non-aggregated colloidal silica comprising reacting an aqueous suspension of a hydrophilic non-aggregated colloidal silica having an average particle diameter greater than about 4 nm with a silicon compound selected from the group consisting of organosilanes described by formula $R^1{}_aH_bSiX_{4-a-b}$ and organosiloxanes described by formula $R^1{}_nSiO_{(4-n)/2}$, where each $R^1$ is independently selected from the group consisting of hydrocarbon radicals comprising 1 to about 12 carbon atoms and organofunctional hydrocarbon radicals comprising 1 to about 12 carbon atoms, each X is independently selected from the group consisting of halogen and alkoxy radicals comprising 1 to about 12 carbon atoms, a=0, 1, 2, or 3, b=0 or 1, a+b=1, 2, or 3 with the proviso that when b=1 then a+b=2 or 3, and n is an integer from 2 to 3 inclusive at a pH less than about pH 4 in the presence of a sufficient quantity of a water-miscible organic solvent to facilitate contact of the hydrophilic non-aggregated colloidal silica with the silicon compound at a temperature within a range of about 20° C. to 250° C. for a time period sufficient to form a hydrophobic non-aggregated colloidal silica.

2. A method according to claim 1 further comprising adding a quantity of a water-immiscible organic solvent sufficient to effect separation of the hydrophobic non-aggregated colloidal silica from the aqueous phase.

3. A method according to claim 2, where the water-immiscible organic solvent is selected from the group consisting of hexamethyldisiloxane and toluene.

4. A method according to claim 2, where the water-immiscible organic solvent is added in an amount providing a solvent to hydrophobic non-aggregated colloidal silica weight ratio within a range of about 0.1:1 to 10:1.

5. A method according to claim 2, where the water-immiscible organic solvent is added in an amount providing a solvent to hydrophobic non-aggregated colloidal silica weight ratio within a range of about 1:1 to 5:1.

6. A method according to claim 2, where the hydrophobic non-aggregated colloidal silica is separated from the water-immiscible organic solvent by spray drying.

7. A method according to claim 1, where the hydrophilic non-aggregated colloidal silica has an average particle diameter within a range of greater than about 4 nm to 150 nm.

8. A method according to claim 1, where the hydrophilic non-aggregated colloidal silica has an average particle diameter within a range of about 5 nm to 100 nm.

9. A method according to claim 1, where the hydrophilic non-aggregated colloidal silica comprises about 1 weight percent to 50 weight percent of the aqueous suspension.

10. A method according to claim 1, where the hydrophilic non-aggregated colloidal silica comprises about 5 weight percent to 20 weight percent of the aqueous suspension.

11. A method according to claim 1, where the hydrophilic non-aggregated colloidal silica is stabilized against aggregation.

12. A method according to claim 1, where the hydrophilic non-aggregated colloidal silica is stabilized against aggregation by alkalization.

13. A method according to claim 1, where $R^1$ is selected from the group consisting of methyl and vinyl.

14. A method according to claim 1, where X is selected from the group consisting of chlorine atoms and methoxy.

15. A method according to claim 1, where the organosilicon compound is added in an amount providing at least about 0.1 organosilyl unit per square nanometer of surface of the hydrophilic non-aggregated colloidal silica.

16. A method according to claim 1, where the water-miscible organic solvent comprises about 10 to 50 volume percent of the total volume of the combined volumes of the aqueous suspension and the water-miscible organic solvent.

17. A method according to claim 1, where the water-miscible organic solvent comprises about 25 to 35 volume percent of the total volume of the combined volumes of the aqueous suspension and the water-miscible organic solvent.

18. A method according to claim 1, where the water-miscible organic solvent is isopropanol.

19. A method according to claim 1 wherein the aqueous suspension further comprises an anionic or nonionic surfactant which does not cause aggregation of the hydrophilic non-aggregated colloidal silica in an amount sufficient to facilitate contact of the organosilicon compound with the hydrophilic non-aggregated colloidal silica.

20. A method according to claim 1, where the pH is within a range of about pH 0 to pH 3.5.

21. A method according to claim 1, where the temperature is within a range of about 30° C. to 150° C.

22. A method for making a hydrophobic non-aggregated colloidal silica comprising (A) reacting an aqueous suspension of a hydrophilic non-aggregated colloidal silica having an average particle diameter within a range of about 5 nm to 100 nm with a silicon compound selected from the group consisting of organosilanes described by formula

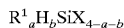

and organosiloxanes described by formula

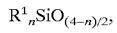

where each $R^1$ is independently selected from the group consisting of hydrocarbon radicals comprising 1 to about 12 carbon atoms and organofunctional hydrocarbon radicals comprising 1 to about 12 carbon atoms, each X is independently selected from the group consisting of halogen and alkoxy radicals comprising 1 to about 12 carbon atoms, a=0, 1, 2, or 3, b=0 or 1, a+b=1, 2, or 3 with the proviso that when b=1 then a+b=2 or 3, and n is an integer from 2 to 3 inclusive at a pH within a range of about pH 0 to pH 3.5 in the presence of about 10 to 50 volume percent of a water-miscible organic solvent to facilitate contact of the hydrophilic non-aggregated colloidal silica with the silicon compound at a temperature within a range of about 30° C. to 150° C. for a contact time of about 0.5 hour to 2 hours thereby forming a hydrophobic non-aggregated colloidal silica and (B) adding a quantity of a water-immiscible organic solvent sufficient to effect separation of the hydrophobic non-aggregated colloidal silica from the aqueous suspension.

23. A method according to claim 22 where the hydrophobic non-aggregated colloidal silica is separated from the water-immiscible organic solvent by spray drying.

24. A silicone composition comprising a hydrophobic non-aggregated colloidal silica prepared by a method comprising:

reacting an aqueous suspension of a hydrophilic non-aggregated colloidal silica having an average particle diameter greater than about 4 nm with a silicon compound selected from the group consisting of organosilanes described by formula

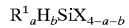

and organosiloxanes described by formula

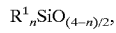

where each $R^1$ is independently selected from the group consisting of hydrocarbon radicals comprising 1 to about 12 carbon atoms and organofunctional hydrocarbon radicals comprising 1 to about 12 carbon atoms, each X is independently selected from the group consisting of halogen and alkoxy radicals comprising 1 to about 12 carbon atoms, a=0, 1, 2, or 3, b=0 or 1, a+b=1, 2, or 3 with the proviso that when b=1 then a+b=2 or 3, and n is an integer from 2 to 3 inclusive at a pH less than about pH 4 in the presence of a sufficient quantity of a water-miscible organic solvent to facilitate contact of the hydrophilic non-aggregated colloidal silica with the silicon compound at a temperature within a range of about 20° C. to 250° C. for a time period sufficient to form a hydrophobic non-aggregated colloidal silica.

25. A silicone composition according to claim 24, where the composition cures to form a silicone elastomer.

26. A hydrophobic non-aggregated colloidal silica prepared by a method comprising reacting an aqueous suspension of a hydrophilic non-aggregated colloidal silica having an average particle diameter greater than about 4 nm with a silicon compound selected from the group consisting of organosilanes described by formula

and organosiloxanes described by formula

where each $R^1$ is independently selected from the group consisting of hydrocarbon radicals comprising 1 to about 12 carbon atoms and organofunctional hydrocarbon radicals comprising 1 to about 12 carbon atoms, each X is independently selected from the group consisting of halogen and alkoxy radicals comprising 1 to about 12 carbon atoms, a=0, 1, 2, or 3, b=0 or 1, a+b=1, 2, or 3 with the proviso that when b=1 then a+b=2 or 3, and n is an integer from 2 to 3 inclusive at a pH less than about pH 4 in the presence of a sufficient quantity of a water-miscible organic solvent to facilitate contact of the hydrophilic non-aggregated colloidal silica with the silicon compound at a temperature within a range of about 20° C. to 250° C. for a time period sufficient to form a hydrophobic non-aggregated colloidal silica.

* * * * *